United States Patent [19]

Umemura et al.

[11] Patent Number: 4,554,089

[45] Date of Patent: Nov. 19, 1985

[54] FERROMAGNETIC PARTICLES WITH STABLE MAGNETIC CHARACTERISTICS AND METHOD OF PREPARING SAME

[75] Inventors: Shizuo Umemura; Tatsuji Kitamoto, both of Kanagawa, Japan

[73] Assignee: Fuji Photo Film Co., Ltd., Kanagawa, Japan

[21] Appl. No.: 545,289

[22] Filed: Oct. 25, 1983

[30] Foreign Application Priority Data

Oct. 25, 1982 [JP] Japan ............................... 57-186036

[51] Int. Cl.[4] ....................... C01G 49/08; C04B 35/26

[52] U.S. Cl. .................................. 252/62.56; 75/251; 148/31.55; 252/62.57; 252/62.58; 252/62.59; 252/62.6; 252/62.61; 252/62.62; 252/62.63; 252/62.64; 428/403; 428/692; 428/693; 428/900

[58] Field of Search ....................... 75/251; 148/31.55; 252/62.56, 62.59, 62.57, 62.58, 62.6, 62.61, 62.62, 62.63, 62.64; 423/151, 152; 428/900, 692, 693; 425/403

[56] References Cited

U.S. PATENT DOCUMENTS

| | | | |
|---|---|---|---|
| 4,043,846 | 8/1977 | Amemiya et al. | 148/105 |
| 4,251,592 | 2/1981 | Takedoi et al. | 428/403 |
| 4,262,037 | 4/1981 | Asada et al. | 427/127 |

FOREIGN PATENT DOCUMENTS

| | | |
|---|---|---|
| 1764982 | 10/1972 | Fed. Rep. of Germany . |
| 2411969 | 9/1975 | Fed. Rep. of Germany . |
| 2,837,257 | 3/1979 | Fed. Rep. of Germany . |
| 1338020 | 10/1962 | France . |
| 428953 | 7/1967 | Switzerland . |
| 2017133 | 10/1979 | United Kingdom . |

OTHER PUBLICATIONS

Swartz et al., "Photon Trapping", *Optics Letters*, vol. 1, (2), Aug. 1977, pp. 73–75.

*Primary Examiner*—Arthur P. Demers

*Attorney, Agent, or Firm*—Sughrue, Mion, Zinn, Macpeak & Seas

[57] ABSTRACT

Cobalt-free ferromagnetic particles are disclosed. The particles are comprised of ferromagnetic metal inner cores and an outer oxidized layer. The particles have a saturation magnetization of 60 to 100 emu/g and a coercive force of 500 Oe or more. The outer layer provides a means for stabilizing the magnetic characteristics of the particles at temperatures not higher than 80° C. in air. The particles are produced by gradually oxidizing ferromagnetic metal particles containing no cobalt in oxygen-containing gas such that the surface-oxidized metal particles have a saturation magnetization of 60 to 100 emu/g. The particles provided have good magnetic characteristics which are maintained with the passage of time even when the particles are subjected to adverse temperature and humidity conditions.

7 Claims, No Drawings

FERROMAGNETIC PARTICLES WITH STABLE MAGNETIC CHARACTERISTICS AND METHOD OF PREPARING SAME

FIELD OF THE INVENTION

The present invention relates to ferromagnetic particles having improved stability with the passage of time and a method for preparing the ferromagnetic particles, and more particularly relates to ferromagnetic metal particles having a thick oxidized layer obtained by heat treatment of metal particles in air.

BACKGROUND OF THE INVENTION

Ferromagnetic particles generally used for a magnetic recording medium can be classified as follows.

(1) $\gamma$-$Fe_2O_3$ (2) $Fe_3O_4$ (3) Intermediate product between $\gamma$-$Fe_2O_3$ and $Fe_3O_4$ (Bertholide oxidation product)

(4) Co-doped $\gamma$-$Fe_2O_3$, $Fe_3O_4$ or Bertholide oxidation product (5) Co-coated $\gamma$-$Fe_2O_3$, $Fe_3O_4$ or Bertholide oxidation product (6) Ferromagnetic metal particles Co-doped or Co-coated ferromagnetic particles (4) and (5) as mentioned above, which have a coericivity (Hc) of 500 to 800 Oe and are obtained by adding Co to ferromagnetic particles (1), (2) and (3) having a coericivity of 300 to 500 Oe have been in increased demand with the increase of high density recording. Further, ferromagnetic metal particles (6) having a higher coercive force (Hc=1000 to 2000 Oe) have also been used. However, Co-added ferromagnetic particles (4) and (5) are not practically preferred because they change their characteristics with the passage of time (e.g., deterioration of erasure effect of signals, transferring, etc.), which is believed to be caused by diffusion of $Co^{2+}$ ions. This phenomena becomes particularly noticeable when these particles are used at high temperature and high humidity. On the other hand, ferromagnetic metal particles (6) are not preferred because the saturation magnetization of ferromagnetic metal particles decreases with oxidation and ferromagnetic metal particles readily ignite, which can cause problems during the manufacturing process.

SUMMARY OF THE INVENTION

A primary object of the invention is to provide ferromagnetic particles having stable characteristics with the passage of time.

Another object of the invention is to provide ferromagnetic particles having a saturation magnetization ($\sigma$s) of 60 to 100 emu/g and a coercive force of not lower than 500 Oe without using Co.

As a result of extensive study on ferromagnetic particles, it has been found that a magnetic recording medium having excellent stability with the passage of time can be prepared by the use of ferromagnetic particles having the same magnetic characteristics as Co-added ferromagnetic particles and excellent stability to oxidation, the ferromagnetic particles being derived from ferromagnetic metal particles which have excellent characteristics with the passage of time (e.g., deterioration of erasure effect of signal, transferring, etc.). Such ferromagnetic particles have first been obtained by gradually oxidizing ferromagnetic metal particles containing no cobalt in oxygen-containing gas such that the surface-oxidized metal particles have a saturation magnetization of 60 to 100 emu/g.

DETAILED DESCRIPTION OF THE INVENTION

The inventors have found that oxidation causes a decrease in saturation magnetization when heat-treating ferromagnetic metal particles in air. Oxidation proceeds from the surface or shell of the particles, the oxidation product formed on the surface contains paramagnetic $Fe^{3+}$ which is found by Mössbauer effect measurement, and even though ferromagnetic metal particles are oxidized until their saturation magnetization is 65 to 80 emu/g which is the same as that of iron oxide, the core of the particles remains a ferromagnetic metal. By this procedure, ferromagnetic particles having higher coercive force and the same saturation magnetization as compared to iron oxide can be obtained.

The inventors have found that ferromagnetic particles as mentioned above do not change with the passage of time as Co-added ferromagnetic particles do. This is because the magnetic element is metal and the core of the ferromagnetic particles which is metal is covered with a thick layer of oxidation product. Therefore, the ferromagnetic particles are never oxidized with the passage of time even at an atmosphere of 80° C. and 90% RH, and are not subject to ignition.

In accordance with the method, ferromagnetic particles having $\sigma$s of 60 to 180 emu/g and Hc of 500 to 2000 Oe which can optionally be selected can readily be prepared.

Ferromagnetic metal particles used as a starting material in the invention can be prepared in accordance with the following methods:

(1) an organic acid salt of ferromagnetic metal is hydrolyzed and then reduced with a reducing gas (see Japanese Patent Publication Nos. 11412/61, 22230/61, 14809/63, 3807/64, 8026/65, 8027/65, 15167/65, 12096/66, 24032/67, 3221/68, 22394/68, 29268/68, 4471/69, 27942/69, 38755/71, 4286/72, 38417/72, 41158/72 and 29280/73, Japanese Patent Application (OPI) No. 38523/72 (the term "OPI" as used herein refers to a "published unexamined Japanese patent application"), and U.S. Pat. Nos. 3,186,829 and 3,190,748);

(2) an acicular oxyhydroxide of a ferromagnetic metal, an acicular oxyhydroxide of a ferromagnetic metal and another metal, or acicular iron oxide derived from these oxyhydroxides is reduced with a reducing gas (see Japanese Patent Publication Nos. 3862/60, 11520/62, 20335/64, 20939/64, 24833/71, 29706/72, 39477/72, 24952/73 and 7313/74, Japanese Patent Application (OPI) Nos. 7153/71, 38523/72, 79153/73, 82395/73 and 97738/74, and U.S. Pat. Nos. 3,598,568, 3,634,063, 3,607,219, 3,607,220 and 3,702,270);

(3) a metal carbonyl compound is thermally decomposed (see Japanese Patent Publication Nos. 1004/64, 3415/65, 16968/70 and 26799/74 and U.S. Pat. Nos. 2,983,997, 3,172,776, 3,200,007 and 3,228,882);

(4) a ferromagnetic metal is vaporized in a low-pressure inert gas (see Japanese Patent Publication Nos. 25620/71, 4131/74, 27718/72, 15320/74 and 18160/74 and Japanese Patent Application (OPI) Nos. 25662/73, 25663/73, 25664/73, 25665/73, 31166/73, 55400/73 and 81092/73);

(5) a metal salt capable of forming a ferromagnetic material in aqueous solution is reduced with a reducing material (e.g., borohydride compound, hypophosphite or hydrazine) to form ferromagnetic particles (see Japanese Patent Publication Nos. 20520/63, 26555/63, 20116/68, 9869/70, 14934/70, 7820/72, 16052/72 and 41718/72, Japanese Patent Application (OPI) Nos. 1363/72, 42252/72, 42253/72, 44194/73, 79754/73 and 82396/73, U.S. Pat. Nos. 3,607,218, 3,756,866, 3,206,338, 3,494,760, 3,535,104, 3,567,525, 3,661,556, 3,663,318, 3,669,643, 3,672,867, and 3,726,664 and Japanese Patent Application Nos. 91498/73, 92720/73, 106901/74 and 134467/73); and (6) particles of a ferromagnetic metal are electrodeposited on a mercury cathode from which the particles are then separated (see Japanese Patent Publication Nos. 12910/60, 3860/61, 5513/61, 787/64, 15525/64 and 8123/65, and U.S. Pat. Nos. 3,262,812, 3,198,717 and 3,156,650).

Of these methods, methods (1)–(5) are preferably employed in the invention, and methods (2) and (4) are particularly preferred.

Ferromagnetic metal particles used in the invention are composed mainly of Fe, and 0 to 5% of elements other than Fe such as Ti, V, Cr, Mn, Ni, Cu, Zn, Si, P, Mo, Sn, Sb or Ag may be added thereto alone or in combination.

It is not preferred that the metal particles obtained in the above methods are contacted with air because they are quickly oxidized. Those particles must be gradually oxidized (first gradual oxidation) to form a layer of oxidation product generally having a thickness of 5 to 50 Å, preferably 20 to 40 Å, on their surface in order to stabilize them. Methods for the first gradual oxidation include a method which comprises soaking the metal particles in an organic solvent (e.g., toluene, xylene etc.) in an inactive gas (e.g., $N_2$, Ar, He, etc.) and evaporating the solvent in air, and a method which comprises introducing a mixture of oxygen having low partial pressure and an inactive gas into an inactive gas, increasing gradually the oxygen partial pressure and finally introducing air therein.

In the invention, thus stabilized ferromagnetic metal particles are further heat-treated in air at not higher than 300° C. (second gradual oxidation), whereby the ferromagnetic metal particles are further oxidized to form on the surface a thick layer of oxidation product generally having a thickness (total) of 50 to 200 Å, preferably 75 to 150 Å and more preferably 75 to 100 Å. When the ferromagnetic metal particles are abruptly heated at heat-treatment, it often happens that the metal particles are quickly oxidized. Accordingly it is preferred that where temperature is raised from room temperature to the temperature of heat treatment, the rate of temperature increase should be slow. Through experiments it was confirmed that the ferromagnetic metal particles are quickly oxidized at a rate of temperature increase of higher than 50° C./hr. Therefore, a rate of temperature increase of not higher than 50° C./hr. is preferred.

If the temperature of heat treatment is too high, the coercive force and saturation magnetization are markedly decreased and there is no advantage over commonly used Co-modified iron oxide. In order to maintain the improved characteristic of the ferromagnetic metal particles at a level above those of commonly used Co-modified iron oxide, the saturation magnetization must be 60 emu/g or more. The heat treatment temperature which decreases the saturation below 60 emu/g is generally 200° C. to 300° C., but this temperature varies depending on the type of metal particles used.

When the temperature of heat treatment is lowered and the saturation magnetization is high, the ferromagnetic metal particles are inferior to iron oxide with regard to oxidation stability. As a result of the present inventors' examining of the saturation magnetization where metal particles of the invention are allowed to stand at 80° C., 90% RH, it was confirmed that when the saturation magnetization was higher than 100 emu/g after heat treatment, the decreasing percentage was higher than 1%, which is inferior to iron oxide. Further, when the saturation magnetization was not higher than 100 emu/g, the decreasing percentage was not higher than 1%, which is not inferior to iron oxide.

Accordingly, the ferromagnetic particles of the invention has a saturation magnetization of 60 to 100 emu/g, preferably 70 to 100 emu/g and a coercive force of not lower than 500 Oe, preferably 600 to 1500 Oe. The ferromagnetic particles preferably have a particle size of not larger than 1.0 μm and more preferably not larger than 0.6 μm. Further, specific surface area (measured by BET method: $N_2$ adsorption method) of the particles is preferably 20 $m^2/g$ or more, and particularly preferably 30 $m^2/g$ or more.

The thus obtained ferromagnetic particles of the invention are used in a conventional manner to produce a magnetic recording medium such as a magnetic tape or sheet. For example, the ferromagnetic particles are blended with conventional binders, additives and solvents and dispersed by a conventional method. The resulting dispersion is applied to a non-magnetic base to produce a magnetic recording medium. The binders, additives, solvents and non-magnetic base and the process for producing the magnetic medium are described in Japanese Patent Publication No. 26890/81 and U.S. Pat. No. 4,135,016.

The invention will be further explained in more detail by the following Examples. However, the scope of the invention is not limited to these examples. In the examples, all parts are by weight.

EXAMPLE 1

Acicular α-FeOOH (length: 0.6 μm, acicular ratio: 20) containing 1% Si was heated at 700° C. for 2 hours in nitrogen gas, dehydrated and reduced at 400° C. for 6 hours in hydrogen gas to obtain acicular α-Fe particles containing Si. The particles were soaked in toluene before they were exposed to air and the toluene was evaporated in air to produce stable black particles (Reference Sample). The black particles were heated in air from the room temperature to 150° C., which took 4 hours and further heated for 30 minutes at 150° C. (Sample No. 1).

EXAMPLE 2

Reference Sample was heated in air from the room temperature to 200° C., taking 5 hours to reach 200° C. and further heated at 200° C. for 30 minutes (Sample No. 2).

EXAMPLE 3

Reference Sample was heated in air from the room temperature to 240° C., taking 6 hours to reach 240° C., and further heated at 240° C. for 30 minutes (Sample No. 3).

COMPARATIVE EXAMPLE 1

Reference Sample was heated in air from the room temperature to 100° C., taking 3 hours to reach 100° C.

and further heated at 100° C. for 30 minutes (Comparative Sample No. 1).

COMPARATIVE EXAMPLE 2

1 Kg of $\gamma$-$Fe_2O_3$ (average length: 0.6 $\mu$m, acicular ratio: 10) was dispersed in 7 liters of water, added with 600 cc of an aqueous solution containing 150 g of $CoCl_2.6H_2O$ and thoroughly stirred. Then 3 liters of an aqueous solution containing 700 g of NaOH was added thereto. The solution obtained was thoroughly stirred and heated at 100° C. for 3 hours while $N_2$ gas was introduced. The solution was water-washed, filtrated and dried to obtain cobalt-modified iron oxide. (Comparative Sample No. 2)

Magnetic characteristics of Sample Nos. 1 to 3 and Comparative Sample Nos 1 and 2 before and after these samples were allowed to stand at 80° C., 90% RH for 2 weeks are shown in Table 1. It is apparent from Table 1 that the coercive force and saturation magnetization were decreased when the comparative samples were allowed to stand at 80° C., 90% RH for 2 weeks. However, no change were observed with the samples of the invention.

TABLE 1

| | Magnetic Characteristics of Particles | | | |
|---|---|---|---|---|
| | Before particles were allowed to stand at 80° C., 90% RH for 2 weeks | | After particles were allowed to stand at 80° C., 90% RH for 2 weeks | |
| | Hc (Oe) | σs (emμ/g) | Hc (Oe) | σs (emμ/g) |
| Reference Sample | 985 | 145 | 1000 | 42 |
| Sample No. 1 | 985 | 99 | 985 | 99 |
| Sample No. 2 | 990 | 81 | 890 | 81 |
| Sample No. 3 | 975 | 70 | 975 | 70 |
| Comparative Sample No. 1 | 980 | 111 | 990 | 105 |
| Comparative Sample No. 2 | 630 | 71 | 635 | 71 |

EXAMPLE 4

300 parts of Sample No. 2 and the following composition were mixed, kneaded and dispersed in a ball mill.

| | |
|---|---|
| Copolymer of vinyl chloride and vinyl acetate ("VMCH" manufactured by U.C.C. Co., Ltd.) | 30 parts |
| Polyurethane resin ("Estane 5701" manufactured by Goodrich Co., Ltd.) | 20 parts |
| Dimethylpolysiloxane (Polymerization degree: about 60) | 6 parts |
| Butyl acetate | 600 parts |
| Methyl isobutyl ketone | 300 parts |

After dispersion, a 75 wt% of ethyl acetate solution containing 25 parts triisocyanate compound ("Desmodule L-75" manufactured by Bayer A. G.) was added thereto and dispersed for 1 hour with high speed shearing force to prepare a magnetic coating composition.

The thus prepared magnetic coating composition was coated on a polyester film in a dry thickness of 4 $\mu$m, subjected to magnetic orientation, surface-treated after drying, and slit to a predetermined width to obtain a magnetic tape (Tape No. 1).

COMPARATIVE EXAMPLE 3

The same procedure as in Example 4 was repeated using Comparative Sample No. 2 to obtain a magnetic tape (Tape No. 2).

Signals of 1 KHz at 0 dB (based on a reference tape) were recorded on Tape Nos. 1 and 2 respectively under an appropriate bias current using a audio cassette deck. The signal levels of erasure obtained before and after the tapes were allowed to stand at 80° C., 40% RH for 1 week are shown in Table 2.

TABLE 2

| | Initial Erasure Level (dB) | Erasure Level After 1 week at 80° C., 40% RH (dB) |
|---|---|---|
| Tape No. 1 | −64 | −64 |
| Tape No. 2 | −65 | −58 |

It is apparent from the above table that the erasure level after the passage of time is same as the initial level with regard to the tape using ferromagnetic particles of the invention and that the erasure level after the passage of time was deteriorated by 7 dB when compared to the initial level with regard to the tape using the conventional Co-modified $\gamma$-$Fe_2O_3$.

Consequently, it is apparent that ferromagnetic particles of the invention are extremely excellent in stability and have high coercive force.

While the invention has been described in detail and with reference to specific embodiment thereof, it will be apparent to one skilled in the art that various changes and modifications can be made therein without departing from the spirit and scope thereof.

What is claimed is:

1. Cobalt-free ferromagnetic particles comprising a ferromagnetic metal inner core and an oxidized outer layer containing paramagnetic $Fe^{3+}$, wherein the particles have a saturation magnetization of 60 to 100 emu/g and a coercive force of 500 Oe or more, and wherein the outer layer provides a means for stabilizing the magnetic characteristics of the particles at a temperature not higher than 80° C. in air.

2. Cobalt-free ferromagnetic particles as claimed in claim 1, wherein the saturation magnetization is in the range of 70 to 100 emu/g and the coercive force is in the range of 600 to 1,500 Oe.

3. Cobalt-free ferromagnetic particles as claimed in claim 1, wherein the outer layer has a thickness of 50 to 200 Å.

4. Cobalt-free ferromagnetic particles as claimed in claim 3, wherein the outer layer has a thickness of 75 to 150 Å.

5. Cobalt-free ferromagnetic particles as claimed in claim 1, wherein the particles have a particles size of not more than 1.0 $\mu$m and a specific surface area of 20 $m^2/g$ or more.

6. Cobalt-free ferromagnetic particles as claimed in claim 1, wherein the particles are comprised of Fe.

7. Cobalt-free ferromagnetic particles as claimed in claim 6, wherein the particles are further comprised of additional elements selected from the group consisting of Ti, V, Cr, Mn, Ni, Cu, Zn, Si, P, Mo, Sn, Sb, and Ag.

* * * * *